United States Patent
Pankratov et al.

(10) Patent No.: US 9,939,058 B2
(45) Date of Patent: Apr. 10, 2018

(54) GEARBOX HAVING GEAR BAFFLE APPARATUS

(71) Applicant: PRATT & WHITNEY CANADA CORP., Longueuil (CA)

(72) Inventors: Maksim Pankratov, Mississauga (CA); Felix Gauthier, Longueuil (CA)

(73) Assignee: PRETT & WHITNEY CANADA CORP., Longueil, Quebec ( * ) Notice: Subject to any disclaimer, the term of this patent is extended or adjusted under 35 U.S.C. 154(b) by 337 days.

(21) Appl. No.: 14/618,402

(22) Filed: Feb. 10, 2015

(65) Prior Publication Data
US 2016/0230875 A1    Aug. 11, 2016

(51) Int. Cl.
F16H 57/00 (2012.01)
F16H 57/04 (2010.01)
F02C 7/36 (2006.01)

(52) U.S. Cl.
CPC ........... F16H 57/0423 (2013.01); F02C 7/36 (2013.01); F16H 57/0409 (2013.01)

(58) Field of Classification Search
CPC ..... F16H 57/0423; F16H 57/0409; F02C 7/36
See application file for complete search history.

(56) References Cited

U.S. PATENT DOCUMENTS

| 3,788,426 A | 1/1974 | Hull, Jr. |
| 5,038,631 A | 8/1991 | Renk et al. |
| 7,984,791 B2 | 7/2011 | Taguchi et al. |
| 8,092,337 B2* | 1/2012 | Tomita .................. B60K 6/365 475/344 |
| 8,167,091 B2* | 5/2012 | Alecu .................... F01D 25/18 184/6.11 |
| 8,499,893 B2* | 8/2013 | Alecu .................... F01D 25/18 184/6.11 |
| 8,517,147 B2 | 8/2013 | Imai et al. |
| 8,752,673 B2* | 6/2014 | Thivierge ............... F01D 25/20 184/6.11 |
| 8,894,538 B2* | 11/2014 | McCune ................ F01D 5/027 475/331 |
| 8,939,864 B2* | 1/2015 | McCune ................ F01D 5/027 475/331 |
| 9,115,650 B2* | 8/2015 | McCune ................ F01D 5/027 |
| 2008/0236951 A1* | 10/2008 | Alecu .................... F01D 25/18 184/6.11 |
| 2009/0233749 A1* | 9/2009 | Tomita .................. B60K 6/365 475/159 |
| 2012/0181113 A1* | 7/2012 | Alecu .................... F01D 25/18 184/6.11 |
| 2014/0286755 A1* | 9/2014 | McCune ................ F01D 5/027 415/124.1 |
| 2015/0065285 A1* | 3/2015 | McCune ............ F16H 57/0423 475/159 |

(Continued)

*Primary Examiner* — Victor L MacArthur
(74) *Attorney, Agent, or Firm* — Norton Rose Fulbright Canada

(57) ABSTRACT

A gearbox in a gas turbine engine includes an enclosed gearbox housing, at least a pair of intermeshing gears lubricated and rotatably supported within the gearbox housing, and a baffle apparatus axially spaced apart from and positioned at least at one side of the pair of gears, the baffle apparatus including a collector defining a main opening adjacent a meshing point of the intermeshing gears for collecting and redirecting lubricant squeezed out axially from the intermeshing gears.

15 Claims, 4 Drawing Sheets

(56) References Cited

U.S. PATENT DOCUMENTS

2015/0323056 A1* 11/2015 Sheridan ................ F02C 7/36
  475/159
2016/0146102 A1* 5/2016 McCune ................ F02C 3/107
  415/122.1

* cited by examiner

GEARBOX HAVING GEAR BAFFLE APPARATUS

TECHNICAL FIELD

The application relates generally to gas turbine engines, and more particularly to a gearbox structure for such engines.

BACKGROUND OF THE ART

Gearboxes operating in high temperature environments such as in gas turbine engines must be configured to preclude excessive heat generation by the gearing itself, and therefore, lubricant for cooling the gears is circulated outside the gearbox for heat exchange. Lubricant churning resulting from lubricant particles being thrown at a high velocity by the rotating equipment and impacting on parts in the gearbox, also contributes to lubricant heat rise. Therefore, baffle apparatuses are used, for example for peripherally surrounding the gears, to divert the splashing lubricant particles. Nevertheless, efforts have been continuing for improved baffle apparatuses and methods for reducing lubricant churning in the gearbox of gas turbine engines.

Accordingly there is a need for an improved method for reducing lubricant churning in a gearbox of gas turbine engines and an improved lubricant baffle apparatus.

SUMMARY

In one aspect, there is provided a gearbox in a gas turbine engine, comprising an enclosed gearbox housing, at least a pair of intermeshing gears lubricated and rotatably supported within the gearbox housing, and a baffle apparatus axially spaced apart from and positioned at least at one side of the pair of gears, the baffle apparatus including a collector defining a main opening adjacent a meshing point of the intermeshing gears for collecting and redirecting lubricant squeezed out axially from the intermeshing gears.

In another aspect, there is provided a method for reducing lubricant churning in a gearbox of a gas turbine engine, comprising: positioning a lubricant scoop at one side of and axially spaced apart from a pair of intermeshing gears in the gearbox such that a main opening of the lubricant scoop substantially, radially and circumferentially covers a number of meshing teeth of the respective gears for collecting and redirecting lubricant squeezed out axially from the meshing teeth; and positioning a lubricant baffle plate for guiding the lubricant collected by the lubricant scoop along the baffle plate down toward a bottom of the gearbox via gravity.

DESCRIPTION OF THE DRAWINGS

Reference is now made to the accompanying drawings in which.

It will be noted that throughout the appended drawings, like features are identified by like reference numerals.

DETAILED DESCRIPTION

Figure 1:
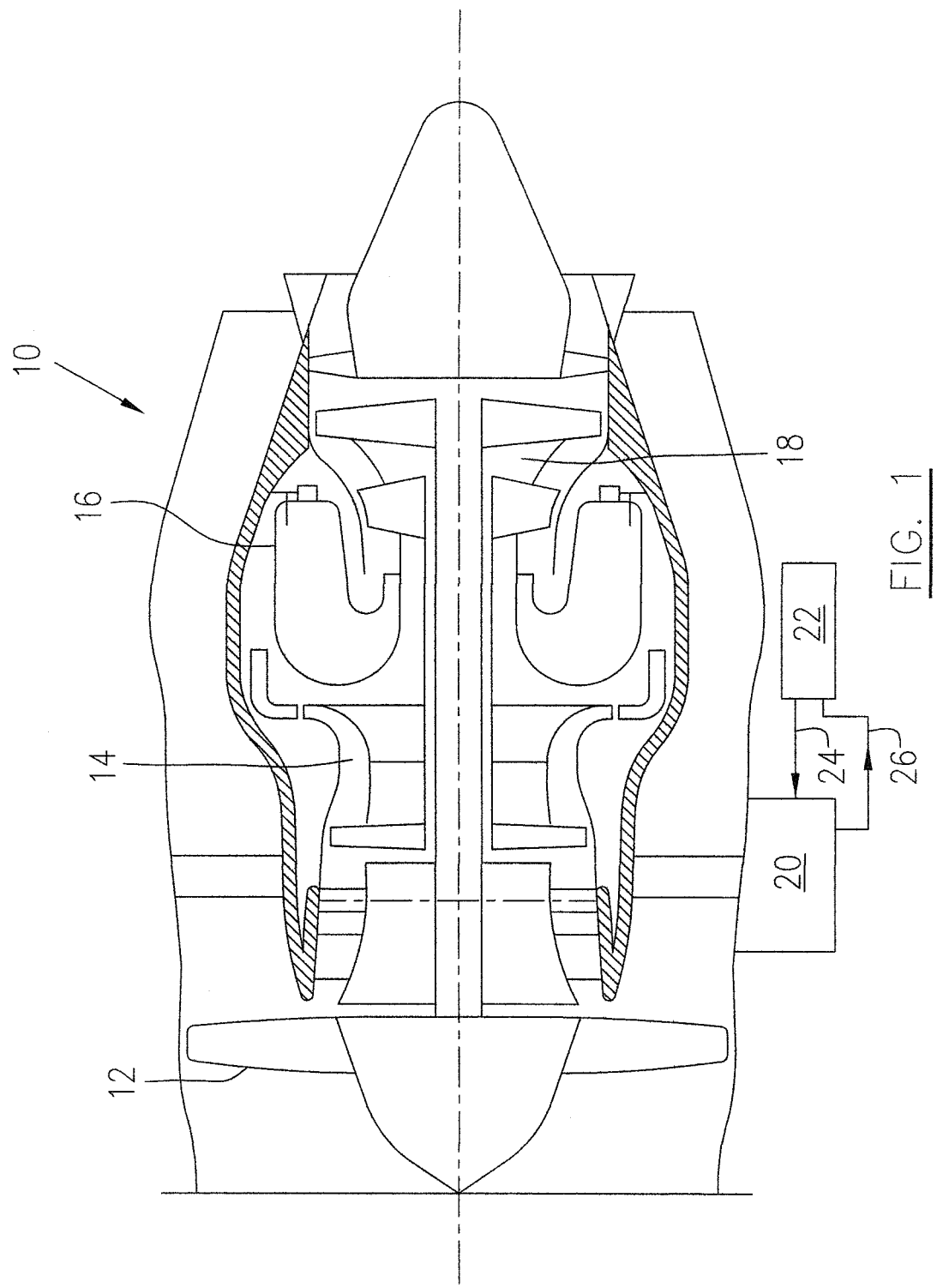
FIG. 1 is a schematic side cross-sectional view of a gas turbine engine as an example illustrating application of the described subject matter.

FIG. 1 illustrates a gas turbine engine 10, which is taken as an exemplary application of the described subject matter. The gas turbine engine 10 generally comprises in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A gearbox structure 20 may be supported on a casing (not numbered) of the gas turbine engine 10. A lubricant supply line 24 and a lubricant scavenging line 26 interconnect the gearbox structure 20 and a lubricant system 22 of the gas turbine engine for providing lubricant circulation between the gearbox structure 20 and the lubricant system 22.

Figure 2:
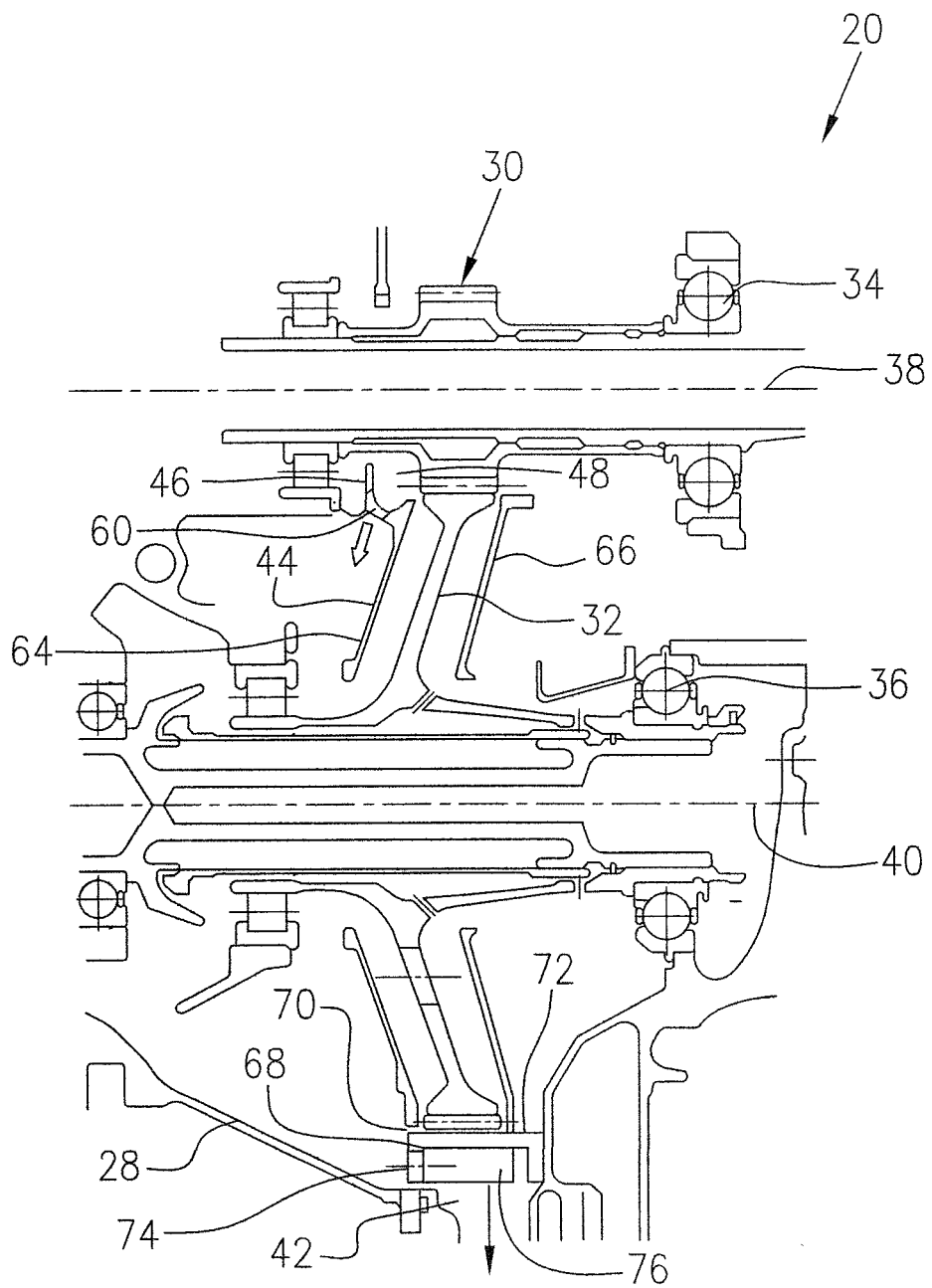
FIG. 2 is a partial cross-sectional view of the gearbox shown in FIG. 1, illustrating a baffle apparatus positioned within the gearbox according to one embodiment.

Referring to FIGS. 1 and 2, the gearbox structure 20 may include an enclosed gearbox housing 28 in which intermeshing gears 30 and 32 may be rotatably supported by suitable bearing means 34 and 36, respectively. The intermeshing gears 30 and 32 may define respective rotating axes 38 and 40 positioned parallel one axis with the other according to one embodiment. Gear 32 may have a diameter larger than the diameter of gear 30 and may be positioned below gear 30. Lubricant may be supplied to the rotating parts of the gearbox structure 20 via the lubricant supply line 24 from the lubricant system 22, for cooling and lubricating the rotating parts. The lubricant may eventually travel via gravity to a bottom of the gearbox housing 28, for example to a sump area 42 in which the lubricant may be collected and discharged through the scavenging line 26 back to the lubricant system 22.

A baffle apparatus (not numbered) may be included in the gearbox structure 20 for capturing flying lubricant particles within the gearbox housing 28 to reduce lubricant churning. According to one embodiment the baffle apparatus may include a baffle plate such as a disk 44 which may be axially spaced apart from and positioned at one side of gear 32. As can be seen from FIG. 2, in the embodiment shown the disk 44 is parallel to and axially spaced apart from gear 32. A central hole (not numbered) may be defined in the disk 44 to allow a shaft on which gear 32 is supported, to axially extend therethrough. The disk 44 may therefore be positioned substantially coaxially with gear 32 and may include a collector which may be configured as a scoop 46 attached to a peripheral region of the disk 44, such as at an upper area thereof adjacent to a meshing area of the intermeshing gears 30, 32. The scoop 46 may be configured and positioned for collecting and redirecting lubricant squeezed out axially from the intermeshing gears 30 and 32.

Figure 4:
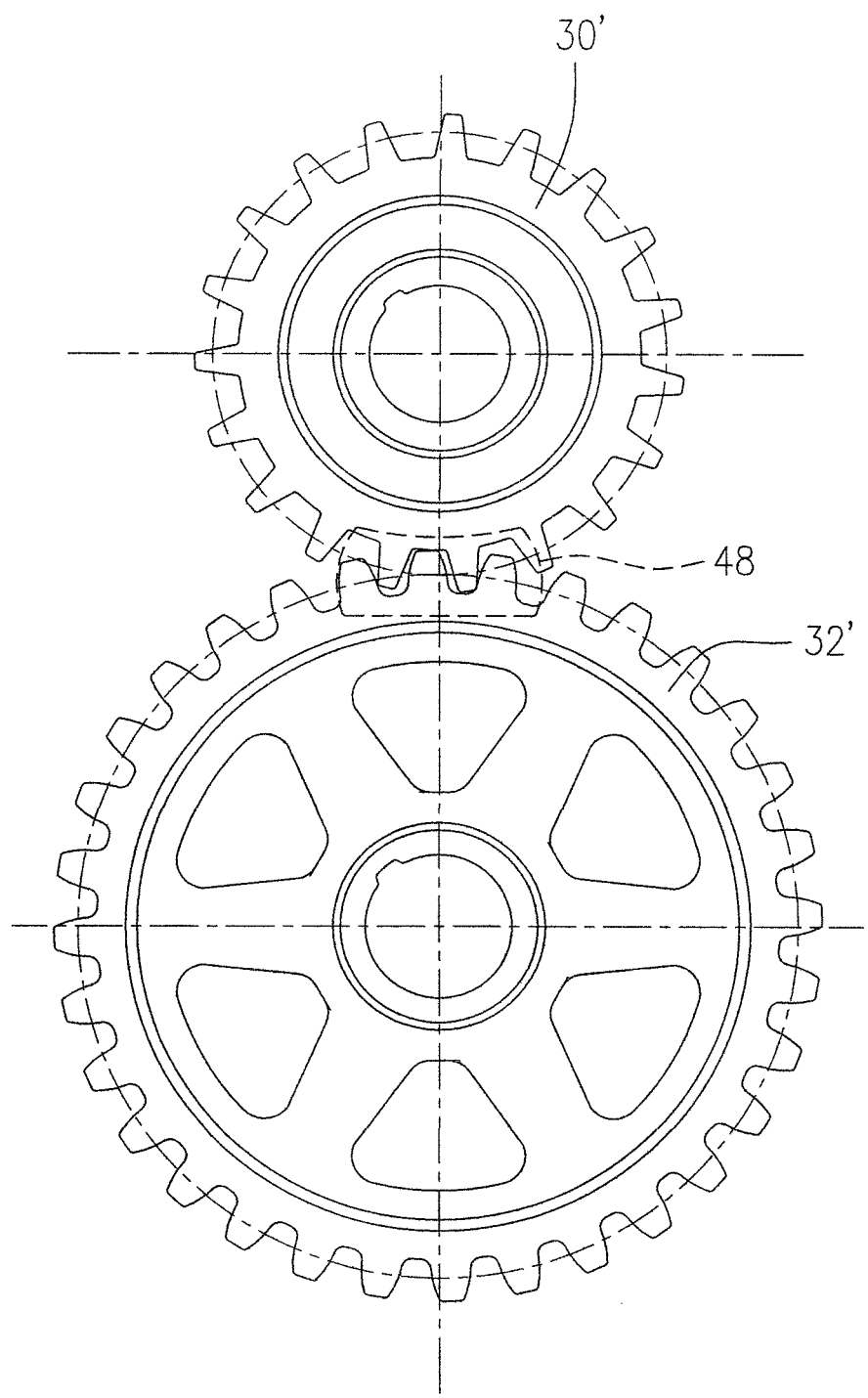
FIG. 4 is a side elevational view of a pair of intermeshing gears of the gearbox according to another embodiment, showing the main opening of the scoop of FIG. 3 substantially covering three pairs of meshing teeth of the respective intermeshing gears.

As more clearly illustrated in FIG. 4 which illustrates intermeshing gears 30' and 32' having a gear ratio different from the gear ratio of intermeshing gears 30 and 32, according to another embodiment. The two gears 30' and 32' are rotated in respective directions via one or more meshing points (not numbered) between meshing teeth (not numbered) of the respective gears 30' and 32'. Therefore, a position adjacent the respective meshing points corresponds to a side or region of the meshing teeth subjected to a gear pump effect of the two gears 30' and 32', resulting in lubricant being squeezed out axially from the meshing teeth. It should be noted that intermeshing gears having spiral teeth may squeeze out lubricant substantially from one side of the gears and intermeshing gears having axially-straight teeth may squeeze out lubricant axially from both sides of the gears.

Figure 3:
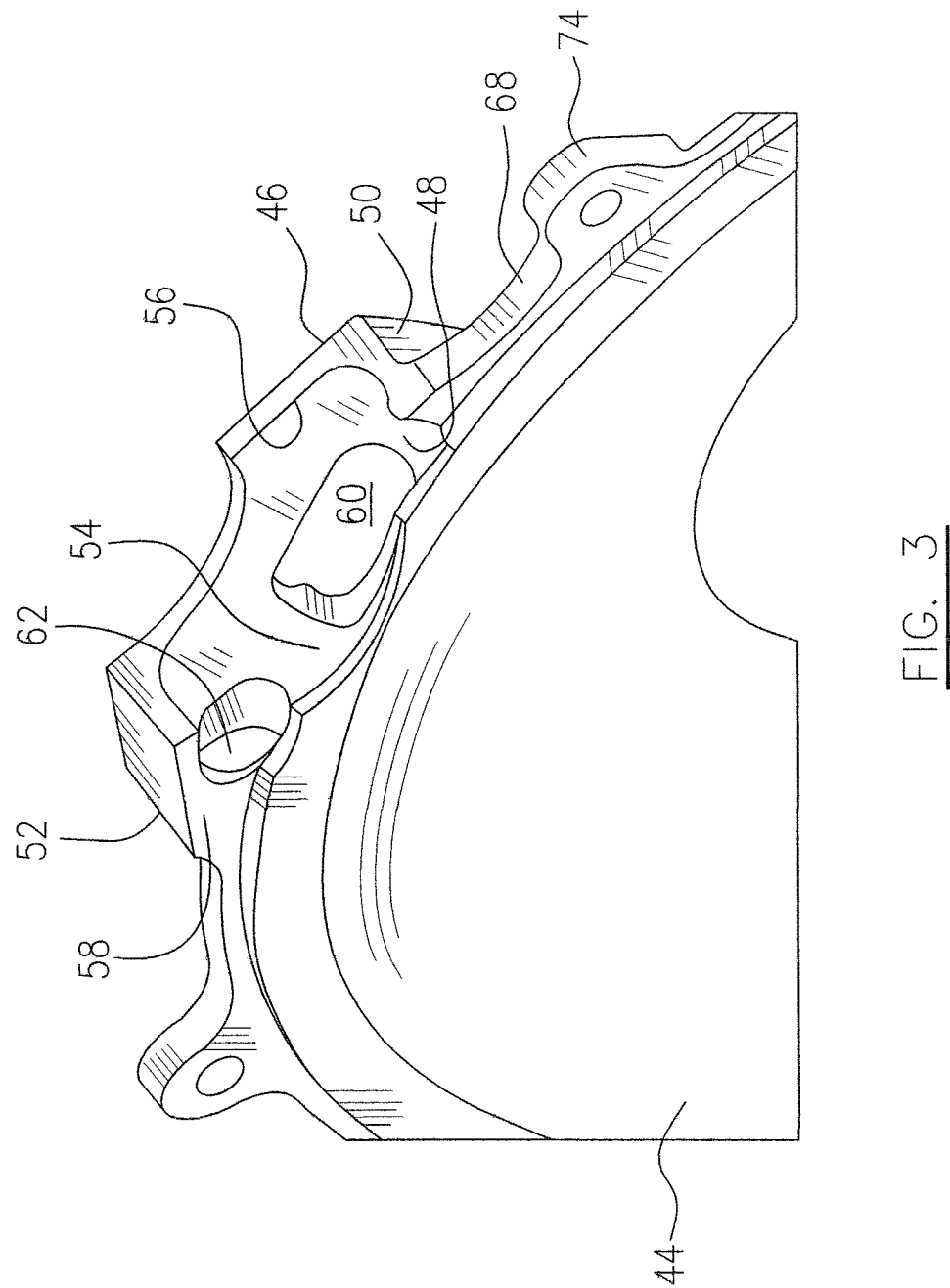
FIG. 3 is a partial perspective view of the baffle apparatus shown in FIG. 2, illustrating a scoop having a main opening.

Referring now to FIGS. 2-4, the scoop 46 according to one embodiment may define a main opening 48 adjacent one or more meshing points between the meshing teeth of the respective gears 30, 32 (or 30', 32'). The main opening 48 may face the gears 30, 32 (or 30', 32') and may be sized to substantially cover the meshing teeth (three pairs of meshing teeth in FIG. 4) of the respective gears in a side view of the meshing teeth, for receiving lubricant squeezed out axially from the meshing teeth.

As illustrated in FIGS. 2 and 3, the scoop 46 according to one embodiment may include opposed end walls 50 and 52, opposed side walls 56 and 58 and a bottom wall 54. The side wall 56 is positioned on a side of the scoop 46 distant from the intermeshing gears 30, 32 and side wall 58 is positioned on a side of the scoop 46 adjacent the intermeshing gears 30, 32 and defines the main opening 48 in the side wall 58. Optionally, side wall 58 may be completely removed and therefore the opposed end walls 50 and 52 may form the main opening 48 of the scoop 46 therebetween on the side of the scoop 46 adjacent the intermeshing gears 30, 32.

The scoop 46 according to one embodiment may further define at least one draining hole such as holes 60, 62 located in side wall 56 or located in end walls 50, 52, immediately adjacent the bottom wall 54 of the scoop 46 and communicating with the main opening 48 (see FIG. 3). The holes 60 and 62 may be in fluid communication with an outer side 64 of the disk 44 (see FIG. 2) which faces away from the intermeshing gears 30, 32. The lubricant collected in the scoop 46 may drain through the holes 60, 62 onto the outer side 64 of the disk 44 and may be guided by gravity down along the disk 44 toward the sump area 42 in the bottom of the gearbox housing 28. As can be seen from FIG. 3, one of the draining holes 60 is oriented along an axial direction of the baffle plate or disk 44 and accordingly of the gear 32, while the other draining hole 62 is oriented along a tangential direction of the baffle plate or disk 44 and accordingly of the gear 32.

The baffle apparatus according to one embodiment may further include disk 66 having a central hole coaxially positioned with and axially spaced apart from the gear 32 at the other side of the gear 32 opposed to the one side of the gear 32 at which the disk 44 is positioned. The disk 66 may be formed with a circumferential flange 68 extending radially from the periphery of the disk 66 to provide a partial shroud to thereby partially and peripherally surround the gear 32. The partial shroud formed by the axially extending flange 68 may capture and collect lubricant particles thrown from the rotating gear 32. The lubricant collected in the partial shroud (circumferential flange 68) may be drained either in a shutdown or running condition through openings or through a clearance 70 radially between the disk 44 and a low location of the shroud adjacent to the bottom of the gearbox housing 28. Optionally, in a running condition the lubricant that could have been trapped between the gear 32 and the circumferential flange 68, may be removed through windows (not shown) defined on the circumferential flange 68, for example at approximately 3 o'clock and 9 o'clock locations, and then may be guided by gravity down along an outer surface of the circumferential flange 68 toward the pump area 42.

The intermeshing gears 30 and 32 according to one embodiment may have spiral teeth which may squeeze lubricant axially out from the meshing teeth at only one side at which the disk 44 with the scoop 46 is positioned. Therefore, no scoop structure is required at the side of the gear 32 at which the disk 66 is positioned. Optionally, when the intermeshing gears have axially-straight teeth, disk 66 may be provided with a scoop similar to the scoop 46 attached to the disk 44.

The disks 44 and 66 may be stationarily supported within the gearbox housing 28. For example, the disk 66 may have one or more braces 72 affixed to the periphery thereof. The braces 72 may be attached to a wall structure (not numbered) of the gearbox housing 28 by fasteners (not shown). A plurality of mounting ears 74 with respective mounting holes (not numbered) extending therethrough, may be provided on the periphery of the disk to allow disk 44 to be supported on the disk 66 by connecting the mounting ears 74 to respective mounting bases 76 which are integrated with the flange 68 of the disk 66, by means of fasteners (not shown).

The above description is meant to be exemplary only, and one skilled in the art will recognize that changes may be made to the embodiments described without departing from the scope of the described subject matter. The described baffle apparatus may be applicable in gearbox structures different from those described and illustrated above. For example, the scoop of the baffle apparatus may be positioned adjacent a meshing area of intermeshing bevel gears and may thus define the respective rotating axes of the bevel gears, for example orthogonal relative to each other. In a gearbox structure in which intermeshing gears are not positioned with the larger gear below the smaller gear, the disk having the scoop attached thereto may be positioned to substantially align with one of the intermeshing gears, that one gear having at least a portion thereof positioned lower than the other of the intermeshing gears, in order to allow the disk to guide draining lubricant along a side thereof down to a location substantially close to the bottom of the gearbox housing. Furthermore, the collector may be configured otherwise, different from the described scoop configuration. Still other modifications which fall within the scope of the described subject matter will be apparent to those skilled in the art, in light of a review of this disclosure, and such modifications are intended to fall within the appended claims.

The invention claimed is:

1. A gearbox in a gas turbine engine, comprising an enclosed gearbox housing, at least a pair of intermeshing gears lubricated and rotatably supported within the gearbox housing, and a baffle apparatus axially spaced apart from and positioned at least at one side of the pair of gears, the intermeshing gears having teeth meshed together at a meshing point, the baffle apparatus including a collector stationarily supported within the gearbox housing, the collector defining a main opening facing the intermeshing gears and located adjacent the meshing point for collecting and redirecting lubricant squeezed out axially from the intermeshing gears at the meshing point.

2. The gearbox as defined in claim 1 wherein the collector comprises a scoop adjacent the meshing point.

3. The gearbox as defined in claim 1 wherein the collector is configured such that the main opening of the collector is radially and circumferentially aligned with and adjacent to a number of meshing teeth of the respective gears at a side of the meshing point for receiving lubricant squeezed out axially from said meshing point.

4. The gearbox as defined in claim 1 wherein the baffle apparatus comprises a baffle plate extending parallel to and axially spaced from one of the intermeshing gears, the collector being attached to an upper area of the baffle plate to allow the lubricant collected in the collector to be guided by the baffle plate down toward a bottom of the gearbox housing.

5. The gearbox as defined in claim 4 wherein the baffle plate is a disc coaxial with the one of the intermeshing gears, the collector being attached to a peripheral region of the disc.

6. The gearbox as defined in claim 5 wherein the disc substantially aligns with one of the intermeshing gears, said one gear having at least a portion thereof positioned lower than the other of the intermeshing gears.

7. The gearbox as defined in claim 4 wherein the collector defines at least one draining hole in fluid communication with an outer side of the baffle plate facing away from the intermeshing gears for draining the lubricant collected in the collector onto said outer side of the baffle plate.

8. The gearbox as defined in claim 7, wherein the at least one draining hole includes a draining hole oriented along an axial direction of the baffle plate.

9. The gearbox as defined in claim 7, wherein the at least one draining hole includes a draining hole oriented along a tangential direction of the baffle plate.

10. The gearbox as defined in claim 7, wherein the at least one draining hole includes a first draining hole oriented along an axial direction of the intermeshing gears and a second draining hole oriented along a tangential direction of the baffle plate.

11. The gearbox as defined in claim 1 wherein the collector comprises at least opposed end walls, a bottom wall and a side wall, the side wall being positioned on a side of the collector distant from the intermeshing gears, and the collector defining the main opening on the other side of the collector adjacent the intermeshing gears.

12. The gearbox as defined in claim 1 wherein the intermeshing gears define respective rotating axes thereof one axis parallel with the other.

13. The gearbox as defined in claim 1, wherein the collector includes a draining hole communicating with the main opening and oriented along an axial direction of the intermeshing gears.

14. The gearbox as defined in claim 1, wherein the collector includes a draining hole communicating with the main opening and oriented along a tangential direction of the intermeshing gears.

15. The gearbox as defined in claim 1, wherein the collector includes a first draining hole communicating with the main opening and oriented along an axial direction of the intermeshing gears and a second draining hole communicating with the main opening and oriented along a tangential direction of the intermeshing gears.

* * * * *